United States Patent [19]

Pearson

[11] Patent Number: 4,552,803

[45] Date of Patent: Nov. 12, 1985

[54] FIRE RETARDANT POWDERS AND METHODS

[76] Inventor: Glenn A. Pearson, 3834 Mt. Vernon Ave., Alexandria, Va. 22305

[21] Appl. No.: 642,772

[22] Filed: Aug. 21, 1984

Related U.S. Application Data

[63] Continuation-in-part of Ser. No. 462,078, Jan. 28, 1983, Pat. No. 4,468,495.

[51] Int. Cl.$^4$ .......................... B32B 7/00; C08L 61/24
[52] U.S. Cl. .................................. 428/262; 19/66 CC; 106/177; 162/159; 252/8.75; 252/608; 427/389; 427/389.9; 427/391; 427/392; 427/393; 427/393.3; 428/264; 428/265; 428/270; 428/276; 428/278; 428/378; 428/500; 428/524; 428/526; 428/528; 428/530; 428/921; 525/54.21; 525/164; 525/443; 525/509
[58] Field of Search ............... 428/262, 264, 270, 276, 428/528, 530, 688, 689, 921, 265, 278, 378; 8/116 P, 185; 427/392, 393, 393.3, 389, 389.9, 391; 525/54.21, 164, 443, 509

[56] References Cited

U.S. PATENT DOCUMENTS 4,419,401 12/1983 Pearson ............................... 428/262

Primary Examiner—Theodore E. Pertilla
Attorney, Agent, or Firm—Lowe, King, Price & Becker

[57] ABSTRACT

Fire retardant compositions in the form of a powder are produced from the following components:

| Component | Parts by Weight |
|---|---|
| Aldehyde | 70–140 |
| Ammonium phosphate | 50–250 |
| Ammonium, alkali metal or alkaline earth metal compound or salt | 50–250 |
| Urea reactant | 70–190 |
| Hydroxy reactant | 20–60 |
| Phosphoric acid | 150–250 |

Also provided are retardant compositions containing the powder and methods for treating substrates, such as paper or wood, as well as cotton, wool, and synthetic textiles to impart fire retardant properties thereto.

24 Claims, No Drawings

FIRE RETARDANT POWDERS AND METHODS

CROSS REFERENCE TO RELATED APPLICATIONS

This application is a continuation-in-part of parent application Ser. No. 462,078, filed Jan. 28, 1983 now U.S. Pat. No. 4,468,495.

FIELD OF THE INVENTION

The present invention relates to resinous powder fire retardant compositions and, more particularly, relates to powders whereby an aldehyde, an ammonium phosphate, a hydroxy reactant, a urea reactant, an ammonium or alkaline earth metal compound, and phosphoric acid are sequentially reacted in selected proportions to yield a resinous powder composition providing unique fire retardant properties and/or characteristics when applied to various cellulosic, animal product and synthetic substrates and when incorporated into materials during their manufacture.

BACKGROUND ART

There is substantial literature describing the use of urea-formaldehyde liquid resins for application to textiles and similar cellulosic and synthetic resin substrates. A number of resins of this type are described in my prior U.S. Pat. Nos. 3,883,462; 3,983,269; 3,984,367; 3,990,977; 4,119,598; and 4,215,172. My prior U.S. Pat. Nos. 4,419,401, dated Dec. 16, 1983 and 4,427,745, dated Jan. 24, 1984, also disclose resinous systems which have excellent fire retardant characteristics.

A number of attempts have been made to condense such systems into powders for use in various materials which present fire hazard problems, and which must be compatible with melamine and urea-formaldehyde adhesives as well as adhesives of various types for use in making plywood and particle board.

The powdered compositions of the present invention are improvements over the aqueous compositions of my prior patents and applications in providing a very stable product which is more efficient than a liquid, reduces shipping costs, and is more fire retardant per pound.

SUMMARY OF THE INVENTION

It is, accordingly, a primary object of the invention to provide a fire-retardant urea-formaldehyde powder resin which does not have objectionable formaldehyde odors.

A further object of this invention is to provide a method for producing the fire retardant powder.

It is a further object of this invention to provide a substantially water-insoluble, fire-retardant resin powder which is useful as a filler in various plastics, adhesives, textiles, and animal and paper products, and for coating a variety of substrates to impart fire-retardant properties thereto.

These and other objects of the present invention will be more readily apparent from the following detailed description.

In satisfaction of the foregoing objects and advantages, there is provided by this invention a composition in the form of a powder which is produced from the following components:

| Component | Parts by Weight |
|---|---|
| Solids | |
| Ammonium phosphate | 50–250 |
| Urea reactant | 70–190 |
| Ammonium, alkali metal or alkaline earth metal compound or salt | 50–250 |
| Liquids | |
| Aldehyde | 70–140 |
| Hydroxy reactant | 20–60 |
| Phosphoric acid | 150–250 |

Also provided by the invention are fire retardant compositions containing the powder, and methods for treating substrates to impart fire retardant properties thereto.

DESCRIPTION OF THE PREFERRED EMBODIMENT

As pointed out above, the present invention is concerned with a urea-formaldehyde resinous powder which has unique characteristics and which is an improvement over the liquid resins described in my prior patents and other prior art. The resinous powder of this invention is particularly suitable as a fire retardant filler and coating for use with cellulosic and synthetic and animal products generally, and particularly for use as a coating or filler with paper, cardboard, wood, or any other material which is subject to burning.

In its broadest aspects, the composition comprises the following components:

| Component | Parts by Weight |
|---|---|
| Solids | |
| Ammonium phosphate | 50–250 |
| Urea reactant | 70–190 |
| Ammonium, alkali metal or alkaline earth metal compound or salt | 50–250 |
| Liquids | |
| Aldehyde | 70–140 |
| Hydroxy reactant | 20–60 |
| Phosphoric acid | 150–250 |

The product is a fine white solid powder which preferably will not pass through a +200 mesh screen. It is insoluble in hot and cold water and is not soluble in ordinary solvents.

The ratios given above should not deviate from the stated amount by more than 15 percent because the unique properties of the polymer may be affected, and to this extent, the ratios are critical. Further, the solid materials should be mixed together first, then added to the liquids which have been premixed in the sequence described herein.

The fire retardant powder of the present invention provides a number of advantages over fire retardants of the prior art, including those of my prior patents and applications discussed above. Thus, since it is a powder rather than an aqueous solution, shipping costs are lower because the solvent does not have to be shipped. Further, more fire retardant per pound is obtained. Further, airing is not required although the composition may have to be dried, either by air drying or by application of heat. Further, the powder resin does not stiffen or weaken fibers. The powder may be applied to paper, wood, plastic, or other substrates, or mixed with other compositions, such as paints. It may be colored with a pigment or dye and may be mixed with $TiO_2$ or carbon black. It may also be mixed with other fillers. An especially important advantage is that the powder does not leave residual formaldehyde odors on the treated substrates.

In one embodiment, the powder is used by mixing with water to form a suspension. Any desired concentration may be used, e.g., from 5 to 50 parts of powder per 100 parts of water. To impregnate fabrics, about 10 to 15 parts of powder in 100 parts of water is preferred. In other embodiments, the powder may be used to coat wood and plastic substrates where a binder is included in the composition. Suitable binders include lacquers and acrylic resins. When using a binder of this type, the binder is the carrier so that water is not necessary. The powder is usually mixed with about 5 to 50 parts of binder. The powder can also be incorporated into fibers and plastic systems, such as polyurethane, to provide fire retardant properties in situ.

The ammonium phosphate, ammonium or alkaline metal compound, and urea reactant are used in the solid form which is available commercially. Equivalent materials may, of course, be used provided the same results are achieved. The phosphoric acid is preferably added as an 85 percent aqueous solution, as this form is commercially available. The urea reactant is selected from the group comprising of urea, substituted ureas and cyclized ureas, including but not limited to urea, thiourea, ethylene urea, dimethylol ethylene urea, melamine, or other substituted urea, including mixtures. Urea is preferred. The urea is preferably added as a commercial form, which contains about 46 percent nitrogen.

As the aldehyde, one may use a simple aldehyde, such as formaldehyde, acetaldehyde, paraldehyde, glyoxal, or other mono-, di-, or poly-aldehydes. In addition, any substance yielding or acting as an aldehyde may be used. Formaldehyde is the preferred aldehyde, as it is conveniently obtained commercially as a 37 weight percent aqueous solution. Mixtures may be used.

The ammonium phosphate may be diammonium phosphate (DAP), monoammonium phosphate (MAP), or mixtures thereof. DAP is preferred.

The preferred hydroxy reactant will have 1 to 4 carbon atoms in the alkyl group, and the most preferred alkanolamine such as triethanolamine. However, other hydroxy reactants, such as diethanolamine, ethylene glycol, or mixtures of any of these, may also be used. Triethanolamine is commercially available as an 85 weight percent solution.

The ammonium, alkali metal or alkaline earth metal compound or salt is selected from the group consisting of chlorides, bromides, and sulfates of ammonium, alkali metal or alkaline earth metals. Preferred materials of this group are ammonium sulfate, ammonium bromide, sodium bromide, sodium chloride, ammonium chloride and magnesium chloride. Mixtures may be used.

In producing the powder of the present invention, the solid ingredients, ammonium phosphate, urea reactant, and ammonium or alkaline earth metal compound are first mixed together. The aldehyde and hydroxy compounds, which are liquids, are then mixed together and added to the solid ingredients. The entire mixture is then heated. The phosphoric acid is then added, causing further heat to be generated. The resulting mixture is then stirred until it turns whitish, at which point it is poured into a milling apparatus, such as a rotary drier, and milled until it becomes a solid mass. A solid will be formed in about 15 to 20 minutes, depending on volume. When the composition cools, slight pressure is applied, and the mass forms a fine white powder, which is highly insoluble to water and is suitable for further grinding. The yields are excellent based on original ingredients. The final pH is preferably in the range of 5.0 to 7.0. Fines may be removed by air classification. Further grinding may be used to further reduce the particle size. The powder contains some moisture and will also regain the moisture loss. Thus, when a 100 g sample was air-dried for 72 hours and then placed in a 350° F. oven for an hour, and reweighed, there was a weight loss of 5 percent. However, the sample regained 4 percent of this weight loss after exposure to the air for 48 hours. The weight loss may, therefore, be attributed to moisture. The powder did not congeal or turn brown, as many urea-formaldehyde products do.

In a further embodiment, a starch such as corn starch, is added with the liquid components in an amount of about 5 to 15 parts by weight. The starch is effective to assist in obtaining a fine powder of the product during milling in that it prevents clumping.

It has been found that formulations produced according to the present invention are particularly useful for application to textiles and textile-related products, since they do not adversely affect the hand of the fabric treated and do not leave residual odors, such as formaldehyde odors, on the fabric. When applied to the surface of the fabric, the fabric will pass the smolder test for fire retardancy, and when immersed in the slurry of the invention, the treated fabric will pass the vertical flame test.

In a further important aspect of the present invention, the addition of an acrylic base to the powder allows the use of the composition as a coating for fiber boards, plywood, and other cellulosic and synthetic substrates.

In another aspect of the invention, the composition can be used as a coating or filler for paper products, thereby imparting self-extinguishing characteristics to the treated products. As a filler, the fire retardant powder is preferably incorporated into the paper by adding it to the furnish in amounts of 1 to 20 weight percent, based on the amount of paper.

In a further aspect of the invention, the composition can be used as a filler for various polymers and plastics that present a fire hazard problem, such as polyester laminates, polyethylene for wire coating, and other uses. It can be incorporated into the polymers and plastics during polymerization.

In a further feature of the invention, the fire retardant powder can be applied to a substrate, such as a synthetic fibrous product, for example, a television backboard made of fiberboard. The fire retardant powder is preferably applied as a mixture of about 1 to 10 weight percent of a sizing or adhesive agent, such as cornstarch, and 90 to 99 weight percent of the powder in one-half to an equal amount of the weight of the components of water. Any sizing agent or adhesive which is compatible with the formulation can be used in this embodiment.

It is a further feature of the invention to provide a new and novel method for providing fire retardant effects to textiles, such as cotton, wool, or synthetic textiles such as nylon, polyesters, and blends with cotton or wool. As is known, cotton, wool and synthetics burn rapidly, and a need remains in the art to provide an effective method to inhibit burning of these materials.

According to the method of this invention, fire or flame retardant effects can be provided to cotton, wool or synthetics which are durable to repeated washings and do not affect the hand or the physical properties of the final fabric. According to this invention, the fire retardant powder is incorporated into the yarns or threads and can be heat-set before or after being incorporated into the fabric, thereby stabilizing the fibers, stopping shrinkage, and providing a better finish. The cure temperature is about 300° F. to 350°, preferably about 325° F., for a few seconds in the case of yarns or threads. The weight of the final fabric will depend on weight and thickness, as at this temperature, the powder melts, flows, and sets. The weight pickup of the fire retardant composition will be about 5 to 30 weight percent.

The fire retardant powder can be applied to the cotton, wool or synthetic textile in any desired manner. It is preferred, however, to apply the fire retardant powder to the cotton, wool or synthetic during the production process so that it is "locked" into the woven fabic. For example, the powder is preferably applied in admixture with a sizing agent or adhesive material directly to the fibers, strands, or filaments prior to weaving. Thereafter, the fire retardant powder can be cured or heat-set during any convenient step in production of the fabric.

Incorporation of the powder into cotton represents a preferred procedure. In the production of cotton, it is known, in general, that cotton is formed by initially being baled at the cotton gin after the seeds have been removed. The cotton is then taken from a number of bales and blended together and separated into large tufts. The tufts are then reduced in size, and quantities of trash or impurities are removed and then further reduced in size and fluffed and additional quantities of trash removed. The tufts are then subjected to carding, in which a picker lap is processed into a thin, mist-like sheet, which is formed into a lose, rope-like strand of fibers known as a card sliver. The slivers are then subjected to further trash removal and a picking operation, after which small tufts are formed into a continuous sheet known as the picker lap. A number of card slivers are brought together and drawn out to form a rope-like strand known as drawn sliver, having straightened fibers and improved uniformity. This drawn sliver is then drawn out into a smaller strand of fibers known as roving. The roving is still further drawn out into a tiny strand of fibers and twisted into a yarn on a ring spinning system, and the card or drawn sliver is reduced into individualized fibers and twisted into a yarn on an open-end spinning system. Thousands of yarns are then wound on a giant spool known as a warper beam. Thereafter, in a slashing operation, yarns from a number of warper beams known as warp yarns are coated with a sizing agent, such as starch, dried, and wound onto a loom beam. From the slashing operation, the warp yarns are then woven on a loom, which is a process of interlacing warp yarns with cross or filling yarns to form a fabric.

It has been found that the fire retardant powder of the present invention can be incorporated into the cotton producing process. In the preferred manner, the fire retardant powder is applied during the slashing operation. It is preferred that the powder initially be mixed with a sizing agent or adhesive, such as starch and water. The preferred mixture is about 95 to 99 weight percent of the fire retardant powder, mixed with about 1 to 5 weight percent of a sizing agent, such as cornstarch, or any suitable sizing agent, contained in about 50 to 100 parts of water. This mixture is then heated to 80° C. to 100° C. and preferably boiled for about 5 to 20 minutes, preferably 10 minutes. On cooling, the resulting product is a paste.

This paste is preferably applied to the yarns which are being subjected to the slashing operation. In the slashing operation presently practiced, the warp yarns are sized with starch, dried, and wound onto a loom beam. At this point, the paste produced as above according to the present invention can be substituted for the paste normally used in the sizing process or included as an additional coating for the yarns treated in the slashing operation. Thereafter, the yarns are subjected to weaving, as conventionally, so that, when the woven fabric is completed, the fire retardant powder is locked in or contained within the woven fabric and is resistant to removal by washing or other means.

The treated yarns or threads can be heat-set before or after being woven into the fabric, thereby stabilizing the fibers, stopping shrinkage, and providing a better finish. The cure temperature should be in the range of about 300° F. to 350° F., preferably about 325° F., for a few seconds for yarns or threads. The weight of the final fabric will depend on the weight and thickness at the temperature the powder melts, flows, and sets. Preferably, the yarn or thread will contain about 5 to 25 weight percent, most preferably about 15 to 20 weight percent, of fire retardant mixture during the treatment.

The above method for incorporation of the fire retardant powder into cotton is also applicable for wool or synthetic fabrics. Thus, the starch/fire retardant reactant mixture is simply substituted for the present sizing materials and added at the point to provide the finished product after curing.

The fire resistant powder may also be incorporated into leather during the tanning process to render the leather resistant to smoldering. During tanning, the powder is mixed with a vehicle, such as water, and is applied to the leather so that the powder is washed into the pores thereof. When the leather is finished, the powder will remain in the pores, and impart smolder resistivity to the finished leather.

The following examples are presented to illustrate the invention, but it is not to be considered as limited thereto. In the examples and throughout the specification, parts are by weight, unless otherwise specified.

EXAMPLE 1

| Component | Parts by Weight |
| --- | --- |
| Solids | |
| Urea | 100 |
| Diammonium phosphate | 100 |
| Ammonium sulfate | 100 |
| Liquids | |
| Water | 100 |
| Formaldehyde (37%) | 243 |
| Ethylene glycol | 30 |
| Cornstarch | 10 |

The solids were mixed together to form a homogenous mixture. The liquids were heated and stirred until the starch dissolved. The solid mixture was added to the liquids, and heated to 180° F., until the liquid became semi-clear. Then, 200 grams of 85 percent phosphoric acid was added, causing further heat to be generated. The liquid was then stirred until it turned whitish and poured into a rotary drier and milled until it became a solid mass. The composition was cooled, and a light pressure was applied until the mass formed a fine, white powder.

EXAMPLE 2

| Component | Parts by Weight |
|---|---|
| Solids | |
| Urea | 150 |
| Melamine (Cymel 405) | 50 |
| Diammonium phosphate | 150 |
| Magnesium sulfate | 150 |
| Liquids | |
| Water | 50 |
| Formaldehyde (37%) | 324 |
| Triethanolamine | 40 |

The solids were mixed together to form a homogenous mixture. The liquids were mixed together, and the solids were added thereto. The mixture was heated to 170° F., until the liquid became semi-clear. Then, 200 grams of 85 percent phosphoric acid was added, causing further heat to be generated. The liquid was then stirred until it turned whitish and poured into a rotary drier and milled until it became a solid mass. The composition was cooled, and a light pressure was applied until the mass formed a fine, white powder.

EXAMPLE 3

| Component | Parts by Weight |
|---|---|
| Solids | |
| Melamine (Cymel 405) | 100 |
| Diammonium phosphate | 150 |
| Ammonium sulfate | 200 |
| Liquids | |
| Water | 50 |
| Formaldehyde (37%) | 324 |
| Sodium borate | 50 |
| Triethanolamine | 40 |

The ingredients were mixed and the fire retardant powder was formed by the procedure of Example 2.

EXAMPLE 4

| Component | Parts by Weight |
|---|---|
| Solids | |
| Urea | 150 |
| Melamine (Cymel 405) | 50 |
| Diammonium phosphate | 200 |
| Ammonium bromide | 100 |
| Liquids | |
| Water | 100 |
| Formaldehyde (37%) | 324 |
| Triethanolamine | 40 |

The ingredients were mixed and the fire retardant powder was formed by the procedure of Example 2.

EXAMPLE 5

The following formulation is prepared:

| Component | Parts by Weight |
|---|---|
| Water | 100 |
| Powder resin of Example 1 | 15 |
| Vinyl acetate | 5 |

A swatch of 100 percent cotton mattress ticking is immersed in a slurry of this formulation and squeezed down to 100 percent, wet, dried, and pressed. The swatch is then hand washed, rinsed, dried, and repressed. A vertical flame test is conducted by hanging the sample vertically over a bunsen burner flame for 10 seconds and removing the flame. The sample chars, but the flame extinguishes itself in a few seconds. The sample passes the test.

EXAMPLE 6

The same treated ticking is then subjected to a cigarette smolder test. A mock-up of a mattress is made by placing a 4×8×2" piece of urethane foam over a 4×8×½" sheet of particle board, and a 10×10" swatch of ticking is pulled tightly over both, and tacked to the back of the board. Three cigarettes are lighted and placed two inches apart and left to burn until consumed. At the end of the test, there is no sign of ignition of the ticking or foam, and the chars on the ticking are the dimensions of the burned cigarettes.

EXAMPLE 7

The same treated ticking is observed for changes in perceptible characteristics and tested for tear strength. The hand or feel of the ticking is excellent, and there is no visible change in color and no odor. When the untreated ticking is tested, the warp tests at 10 pounds, and the fill at 8 pounds. The treated sample tests at 9 pounds in warp and 7.5 pounds in fill.

EXAMPLE 8

The following formulation is prepared:

| Component | Parts by Weight |
|---|---|
| Water | 400 |
| Paper towel | 8 |
| Powder resin of Example 1 | 1.25 |

The water is placed in a kitchen blender. The paper towel is shredded and dropped into the water while the blender was running, thereby forming a slurry of paper fiber. The fire retardant powder resin is added and blended thoroughly for 2 to 3 minutes. The slurry is poured over a screen which has been placed over a pan to catch excess water. The drained mat of fibers is then pressed to remove more water, and the damp mat is rolled onto a flat surface and completely dried with a hot air blower. The resulting sheet is about 1/32 of an inch in caliper and measured 10×9" in length and width. A number of strips are then cut and subjected to the vertical burn test. All are self-extinguishing.

EXAMPLE 9

Two samples of fiberboard used in TV backs are prepared. Both have been coated with a fire retardant sufficiently to pass the burn test as required by Underwriters Laboratories. One sample is further coated with a composition comprising the fire resistant powder of Example 1 and an acrylic based binder manufactured by Rohm & Haas. The other board sample is treated with the composition of Example 1 of my prior filed application Ser. No. 404,916, filed Aug. 3, 1982, now U.S. Pat. No. 4,427,745. Both samples pass the burn test.

The board treated with the composition of U.S. Pat. No. 4,427,745 is then subjected to the dielectric test as follows: Two lead wires are connected to the untreated fiberboard 1 inch apart, and a voltage of 1600 v is applied, resulting in a current of 25 micro amps. An arc is observed.

The same test was conducted on the board with the powder resin of Example 1, and no arcing was observed, thus demonstrating that the composition of the invention will pass the dielectric test when this is a problem, as in the TV backboard industry.

EXAMPLE 10

In this example, 100 grams of the powder and starch mixture (3 grams of starch and 97 grams of the powder of Example 1) contained in 100 grams of water are brought to a boil at 212° F. (100° C.) and boiled or cooked for 10 minutes. The powder and starch apparently cross-link and form a thin paste. During boiling, a slight odor of formaldehyde is noted, from which it is believed that the formaldehyde and starch has reacted. The paste is then applied to television fiberboard backboards and dried. The resulting boards pass the flame test, as well as the dielectric test. However, it is difficult to dry the boards because of the large amount of water present using the equipment available.

EXAMPLE 11

In this experiment, samples of treated and untreated cotton upholstery fabric are immersed in a bath containing 97 parts of the powder of Example 1, 3 parts corn starch, and 150 parts of water, so as to obtain 18 percent by weight of pick-up. There was then added 10 percent of NPA Teflon by weight as a soil and stain resistant solution. Five percent of fabric softener waas added. This mixture was absorbed into the sample and dried and cured on a hot head press for 30 seconds. The resulting fabric passed the burn test.

The invention has been described herein with reference to certain preferred embodiments. However, as obvious variations thereon will become apparent to those skilled in the art, the invention is not considered to be limited thereto.

I claim:

1. An article of manufacture comprising a substrate coated with a fire retardant composition comprising a powder resin which is the reaction product of the following components: (a) about 70–140 parts by weight of an aldehyde, (b) about 50–250 parts by weight of an ammonium phosphate, (c) about 50–250 parts by weight of ammonium, alkali metal or alkaline earth metal compound or salt, (d) about 70–190 parts by weight of a urea reactant, (e) about 20–60 parts by weight of hydroxy reactant, and (f) about 150–250 parts by weight of phosphoric acid, components (a), (b), (c), (d), and (e) having been mixed together and heated at temperatures of about 160°–200° F., the phosphoric acid then being added to the mixture of the other components.

2. An article of manufacture according to claim 1 wherein the composition also contains a water miscible binder selected from the group consisting of lacquer and an acrylic resin.

3. An article of manufacture according to claim 1 wherein the aldehyde in the composition is present in an amount of about 80–130 parts by weight, the ammonium phosphate is present in an amount of about 70–230 parts by weight, the ammonium, alkali metal or alkaline earth metal compound or salt is present in an amount of about 70–230 parts by weight, the urea reactant is present in an amount of about 90–170 parts by weight, the hydroxy reactant is present in an amount of about 30–50 parts by weight, and the phosphoric acid is present in an amount of about 160–240 parts by weight.

4. An article of manufacture according to claim 3 wherein the composition contains about 5–50 parts by weight of a water miscible binder selected from the group consisting of lacquer and an acrylic resin.

5. An article of manufacture according to claim 1 wherein the aldehyde in the composition is 37 percent formaldehyde.

6. An article of manufacture according to claim 1 wherein the hydroxy reactant in the composition is 85 percent triethanolamine.

7. An article of manufacture according to claim 1 wherein the phosphoric acid in the composition is 85 percent phosphoric acid.

8. An article of manufacturing according to claim 1 wherein the ammonium phosphate in the composition is diammonium phosphate.

9. An article of manufacture comprising a substrate coated with a fire retardant powder composition comprising about 243 parts of 37 percent formaldehyde, about 100 parts of diammonium phosphate about 100 parts of ammonium sulfate, about 100 parts of urea, about 30 parts of ethylene glycol, and about 200 parts of 85 percent phosphoric acid, the phosphoric acid being added to a mixture of the other ingredients.

10. An article of manufacture according to claim 9 wherein the composition also contains a water miscible binder selected from the group consisting of lacquer and an acrylic resin.

11. An article of manufacture according to claim 1 wherein the substrate is a fiberboard substrate.

12. An article of manufacture according to claim 1 wherein the substrate is a paper substrate.

13. An article of manufacture according to claim 1 wherein the substrate is a textile.

14. An article of manufacture according to claim 1 wherein the substrate is a synthetic fabric.

15. A fire retardant plastic composition, said plastic composition containing as a filler a fire retarding amount of a powder resin which is the reaction product of the following components: (a) about 70–140 parts by weight of an aldehyde, (b) about 50–250 parts by weight of an ammonium phosphate, (c) about 50–250 parts by weight of ammonium, alkali metal or alkaline earth metal compound or salt, (d) about 70–190 parts by weight of a urea reactant, (e) about 20–60 parts by weight of hydroxy reactant, and (f) about 150–250 parts by weight of phosphoric acid, components (a), (b), (c), (d), and (e) having been mixed together and heated at temperatures of about 160°–200° F., the phosphoric acid then being added to the mixture of the other components.

16. A paper composition, said paper composition containing as a filler a fire retarding amount of a powder resin which is the reaction product of the following components: (a) about 70–140 parts by weight of an aldehyde, (b) about 50–250 parts by weight of an ammonium phosphate, (c) about 50–250 parts by weight of ammonium, alkali metal or alkaline earth metal compound or salt, (d) about 70–190 parts by weight of a urea reactant, (e) about 20–60 parts by weight of hydroxy reactant, and (f) about 150–250 parts by weight of phosphoric acid, components (a), (b), (c), (d), and (e) having been mixed together and heated at temperatures of about 160°–200° F., the phosphoric acid then being added to the mixture of the other components.

17. A paint composition, said paint composition containing as a filler a fire retarding amount of a powder resin which is the reaction product of the following comonents: (a) about 70–140 parts by weight of an aldehyde, (b) about 50–250 parts by weight of an ammonium phosphate, (c) about 50–250 parts by weight of ammonium, alkali metal or alkaline earth metal compound or salt, (d) about 70–190 parts by weight of a urea reactant, (e) about 20–60 parts by weight of hydroxy reactant, and (f) about 150–250 parts by weight of phosphoric acid, components (a), (b), (c), (d), and (e) having been mixed together and heated at temperatures of about 160°–200° F., the phosphoric acid then being added to the mixture of the other components.

18. An article of manufacture comprising cotton or wool containing a fire retarding amount of a fire retardant powder, said powder being contained on the yarns or threads of the cotton or wool, said fire retardant powder being a resin powder which is the reaction product of the following components: (a) about 70–140 parts by weight of an aldehyde, (b) about 50–250 parts by weight of an ammonium phosphate, (c) about 50–250 parts by weight of ammonium, alkali metal or alkaline earth metal compound or salt, (d) about 70–190 parts by weight of a urea reactant, (e) about 20–60 parts by weight of hydroxy reactant, and (f) about 150–250 parts by weight of phosphoric acid, components (a), (b), (c), (d), and (e) having been mixed together and heated at temperatures of about 160°–200° F., the phosphoric acid then being added to the mixture of the other components.

19. An article of manufacture according to claim 18 wherein the cotton or wool is woven and the fire retardant powder is applied prior to the weaving step.

20. An article of manufacture according to claim 18 wherein the fire retardant powder is applied to the cotton or wool as a paste in admixture with a sizing agent and water.

21. An article of manufacture according to claim 20 wherein the paste is formed by mixing about 90 to 99 weight percent of the fire retardant powder with about 1 to 10 weight percent of starch in one-half to an equal amount of water and heating until the reaction is complete.

22. A method for the production of a fire retardant cotton or wool article of manufacture of claim 18 which comprises mixing a fire retardant resin powder with a sizing agent and water, said fire retardant powder being a powder resin which is the reaction product of the following components: (a) about 70–140 parts by weight of an aldehyde, (b) about 50–250 parts by weight of an ammonium phosphate, (c) about 50–250 parts by weight of ammonium, alkali metal or alkaline earth metal compound or salt, (d) about 70–190 parts by weight of a urea reactant, (e) about 20–60 parts by weight of hydroxy reactant, and (f) about 150–250 parts by weight of phosphoric acid, components (a), (b), (c), (d), and (e) having been mixed together and heated at temperatures of about 160°–200° F., the phosphoric acid then being added to the mixture of the other components to form said powder resin, applying said powder resin to the cotton or wool prior to forming the article and forming the article.

23. A method according to claim 22 wherein the fire retardant resin powder is applied to cotton during the slashing stage of production by the steps comprising:
(a) initially mixing the resin powder with a sizing agent or adhesive in water admixture;
(b) heating the mixture to 80° C. to 100° C. and then boiling for 5–20 minutes;
(c) cooling the product until a paste is formed; and
(d) applying the paste to the yarns being subjected to the slashing process.

24. The method of claim 23 wherein the mixture comprises 95–99 wt. % of the fire retardant powder, mixed with about 1–5 wt. % of a starch sizing agent and about 50–100 parts of water.

* * * * *